(12) United States Patent
Su

(10) Patent No.: US 9,206,565 B2
(45) Date of Patent: Dec. 8, 2015

(54) HEATING PROCESS AND DEVICE FOR THERMALLY REGENERATING WASTE ASPHALT MIXTURE

(76) Inventor: Qiang Su, Chengdu (CN)

(*) Notice: Subject to any disclaimer, the term of this patent is extended or adjusted under 35 U.S.C. 154(b) by 0 days.

(21) Appl. No.: 14/130,912

(22) PCT Filed: Jul. 3, 2012

(86) PCT No.: PCT/CN2012/078115
§ 371 (c)(1),
(2), (4) Date: Jan. 4, 2014

(87) PCT Pub. No.: WO2013/004176
PCT Pub. Date: Jan. 10, 2013

(65) Prior Publication Data
US 2014/0133907 A1      May 15, 2014

(30) Foreign Application Priority Data

Jul. 4, 2011    (CN) .......................... 2011 1 0184763

(51) Int. Cl.
*E01C 21/00*    (2006.01)
*C10C 3/00*    (2006.01)
*E01C 19/10*    (2006.01)

(52) U.S. Cl.
CPC ................ *E01C 21/00* (2013.01); *C10C 3/007* (2013.01); *E01C 19/1004* (2013.01)

(58) Field of Classification Search
CPC ....... E01C 23/14; E01C 23/065; E01C 7/187; E01C 19/1004; E01C 21/00; C08L 2555/24
USPC ....................................................... 404/77, 79
See application file for complete search history.

(56) References Cited

U.S. PATENT DOCUMENTS

| | | | | |
|---|---|---|---|---|
| 4,373,961 A * | 2/1983 | Stone | .......................... | 106/281.1 |
| 4,540,287 A * | 9/1985 | Servas et al. | ...................... | 366/7 |
| 4,619,550 A * | 10/1986 | Jeppson | .......................... | 404/80 |
| 4,921,730 A * | 5/1990 | Sasaki | .......................... | 427/138 |
| 7,448,825 B2 * | 11/2008 | Kasahara et al. | ............... | 404/80 |
| 2007/0122235 A1 * | 5/2007 | Kasahara et al. | ............... | 404/75 |

* cited by examiner

*Primary Examiner* — Abigail A Risic
(74) *Attorney, Agent, or Firm* — Raymond Y. Chan; David and Raymond Patent Firm

(57) ABSTRACT

A hot recycling heating method for old asphalt mixture, includes the steps of: mixing old asphalt mixture with hot asphalt, with the temperature of the hot asphalt being higher than the temperature of the old asphalt mixture, but not higher than the standard temperature of heating asphalt; and heating the old asphalt mixture by heat exchange between the hot asphalt and the old asphalt mixture. The method is essentially described as mixing the old asphalt mixture with the hot asphalt to result in a new mixture of the old asphalt mixture and the hot asphalt, thus the purpose of heating the old asphalt mixture by a gapless heat exchange environment between the hot asphalt and the old asphalt is reached; in addition, the method revolutionizes the traditional recycling heating modes for old asphalt, significantly reduces the degree of degradation in the performance of the old asphalt mixture during a heating process, improves the pavement performance of the old asphalt mixture, greatly reduces generation and emission of asphalt fumes during a heating process, and avoids or reduces pollution and damage to the natural environment.

6 Claims, 2 Drawing Sheets

101 — Mixing old asphalt mixture and hot asphalt, wherein the temperature of the hot asphalt is higher than the temperature of the mixture of the old asphalt mixture but not excess the standard heating temperature of asphalt.

102 — Heating the old asphalt mixture by the heat exchange of the hot asphalt and the old asphalt mixture.

HEATING PROCESS AND DEVICE FOR THERMALLY REGENERATING WASTE ASPHALT MIXTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention belongs to the technical field of road construction, and more particularly to a hot recycling heating method and device for old asphalt mixture.

2. Description of Related Arts

Hot recycling of old asphalt mixture is a common way of recycling asphalt in road construction.

The existing method of hot recycling of old asphalt mixture principally consists of a drying drum heating mode wherein the sieved and cold-blended old asphalt mixture is conveyed to a drying drum that is compatible in use with a gap-type asphalt mixture mixing plant, convection or convection/radiation-based heat exchange is accomplished between the old asphalt mixture and the burner-resulting in high-temperature fumes that heat the old asphalt mixture in the drying drum, and the heated old asphalt mixture is metered, then conveyed into an agitator pot and finally agitated and mixed with the heated materials such as mineral aggregate, new asphalt and mineral powder, so as to generate a recycled asphalt mixture.

In the aforementioned hot recycling mode, the hot recycling heating method for the old asphalt mixture is implemented inside the drying drum; the burner-resulting high-temperature fumes in the drying drum have an extremely high temperature, so the asphalt that covers the mineral aggregate like a thin film undergoes intensive aging and generates a large amount of asphalt volatiles, i.e. asphalt fumes.

The pavement performance of the asphalt in the existing method hot recycling mode is greatly diminished because of contact and heat exchange between the old asphalt mixture in the drying drum. Plus the high-temperature fumes produced in the drying drum causes severe environmental pollution

SUMMARY OF THE PRESENT INVENTION

The present invention is advantageous in that it provides a heating process and device for thermally regenerating waste asphalt mixture. In other words, a hot recycling heating method for old asphalt mixture, which achieves heating for old asphalt mixture by a gapless heat exchange environment between hot asphalt and old asphalt mixture, significantly reduces the degree of degradation in the performance of the old asphalt mixture during a heating process, greatly reduces generation and emission of asphalt fume to further reduce or avoid environmental pollution, and improves the pavement performance of the old asphalt mixture.

Other advantages of the invention can be understood through describing the steps of the improved manner of specific implementation of hot recycling for an old asphalt mixture that comprises the steps below:

Step 1 Mixing: An old asphalt mixture is mixed with hot asphalt to form a mix of the old asphalt mixture and the hot asphalt, wherein the temperature of the hot asphalt is higher than the temperature of the old asphalt mixture, but not higher than the standard temperature of heating asphalt. The temperature of the mix is slightly lower than the temperature of the hot asphalt when the old asphalt mixture and the hot asphalt are mixed, and higher weight ratio of the old asphalt mixture in the mix leads to more significant temperature reduction of the mix, therefore, the mix of the old asphalt mixture and the hot asphalt further needs to be heated as required during mixing to compensate for a heat decrease during the heat exchange process, increase the temperature of the mix during and after mixing and increase the weight ratio of the old asphalt mixture to the hot asphalt in the mix so that the weight ratio is 0.1:1-40:1.

Step 2 Heat Exchange: During mixing, a part of heat in the hot asphalt is transferred to the old asphalt mixture, and heating for the old asphalt mixture is achieved by a gapless heat exchange environment between the hot asphalt and the old asphalt mixture. During mixing, the hot asphalt is immersed in the old asphalt mixture to soak the old asphalt mixture therein, as a result, the old asphalt that covers the surface of old aggregate grains does not come into any contact with the outside which remarkably reduces surface aging, Further, the temperature of the hot asphalt is not higher than the standard temperature of heating asphalt and thereby achieves effective control of aging of the old asphalt mixture, effectively solving the aging problem of the old asphalt mixture. Simultaneously, the hot asphalt is immersed in the old asphalt mixture when the old asphalt mixture and the hot asphalt are mixed, thus the contact area between the mix and the outside is diminished dramatically to greatly reduce generation and emission of asphalt fumes and environmental pollution as well. When the mix of the old asphalt mixture and the hot asphalt is heated, gaps of the old asphalt mixture are filled with the old asphalt mixture-immersed hot asphalt, thus, the aging and volatilization surfaces are diminished when the old asphalt mixture is heated, and both aging of the old asphalt mixture and, thereby, generation and emission of the asphalt fume are reduced remarkably.

To further describe the heat exchange step, normal ambient temperature asphalt may not be preheated before mixing, and the specific procedure is as follows: at first, the normal-temperature asphalt is placed in a heat exchange container and covered by the old asphalt mixture, then the old asphalt mixture and the normal ambient temperature asphalt are heated, the heat-absorbing normal ambient temperature asphalt is molten to form the hot asphalt, the hot asphalt is immersed in the old asphalt mixture, a part of heat in the hot asphalt is transferred to the old asphalt mixture, and heating for the old asphalt mixture is achieved by heat exchange between the hot asphalt and the old asphalt mixture.

The hot asphalt has a temperature of 60-170° C.

Steps 1 and 2 may be augmented by agitation. The hot asphalt is immersed in the old asphalt mixture when the old asphalt mixture and the hot asphalt are mixed, but in order to uniformly improvement of the heat exchange efficiency between the old asphalt mixture and the hot asphalt, the mixture may be achieved by agitating the mix of the old asphalt mixture and the hot asphalt. Further advantages of this invention that are attained when the mix is agitated include improving the pavement performance by adding a proper amount of additive during agitation to modify asphalt performance.

The method of the present invention may include an increase in the temperature of the mix of the old asphalt mixture and the hot asphalt to 145-170° C. by heating and keeping the temperature at 145-170° C. This facilitates use of the mix of the old asphalt mixture and the hot asphalt for producing a recycled hot-mix asphalt mixture under current specifications.

In accordance with other aspects of the invention that comprise the present invention it has the beneficial effects that:

The aging phenomenon that occurs very easily during the old asphalt recycling process is overcome, and the pavement performance of the old asphalt mixture is improved: the contact area of the granular old asphalt mixture and the outside (containing oxygen) is greatly diminished because the hot asphalt is immersed in the granular old asphalt mixture, furthermore, the heating temperature of the hot asphalt is not higher than the heating temperature regulated in industry standards, realizing effective control for aerobic and high-temperature environments that cause aging of the old asphalt mixture, therefore, the aging problem of the old asphalt mixture is effectively controlled, and the pavement performance of the old asphalt mixture is effectively improved.

(2) Generation and emission of the asphalt fumes are greatly reduced, and environmental pollution and damage are avoided: the volatilization area of the old asphalt mixture is greatly reduced just because the hot asphalt is immersed in the granular old asphalt mixture, as a result of this, the asphalt fume generated by the heated old asphalt mixture is greatly reduced, and environmental pollution and damage during the old asphalt recycling process are greatly reduced as well.

(3) The heating efficiency is high, the temperature of the hot asphalt is not higher than the standard temperature of heating asphalt, and the energy-saving effect is good: the hot asphalt can be immersed in the gaps of the old asphalt mixture very easily due to its liquid state, in this way, the hot asphalt and the old asphalt mixture come into full contact with each other to achieve efficient heat transfer between the hot asphalt and the old asphalt mixture; the method of the present invention, which employs solid/liquid mixed heat exchange, has a higher heat exchange efficiency than the existing solid heating method based mainly on gas convection/radiation or the existing solid heating method based mainly on solids contact, in addition, the method of the present invention is capable of decreasing the temperature of the hot asphalt (heating body), so that the temperature of the hot asphalt and the temperature of the old asphalt mixture (heated body) are controlled to be within the standard temperature of heating asphalt, and the method may also save energy.

(4) The old asphalt recycling heating mode is revolutionized: the recycling heating method described in the present invention is essentially featured by mixing the old asphalt mixture with the hot asphalt to result in gapless contact between the old asphalt mixture and the hot asphalt, thus the purpose of heating the old asphalt mixture by a gapless heat exchange environment between the hot asphalt and the old asphalt is reached. In the traditional solid-solid heating mode, new aggregate and old asphalt mixture are in irregular shapes, so point contact is formed between solids, leading to small heat exchange area and low heat exchange efficiency, however, adopted in the method of the present invention is a solid-liquid heating mode in which surface contact is realized, thus the heat exchange area is increased and the heating efficiency is improved prominently. Although the traditional solid-gas (high-temperature fume, etc.) heating mode achieves larger contact area and heat exchange area as well as better heating efficiency than the solid-solid heating mode, it is still difficult to isolate the heated old asphalt mixture with the outside because the gas (high-temperature fume) is high in temperature and is mixed with the air, thus, this causes severe aging and considerable volatilization of the old asphalt covering the surface of the old asphalt mixture grains. The solid-liquid heating method described in the present invention achieves higher heat exchange efficiency than gas (fumes); this is because liquid exchange heat and unit temperature difference is higher per unit volume than gas exchange. Furthermore, the hot asphalt is immersed in the granular old asphalt mixture to fill in the gaps among the grains of the old asphalt mixture, so the old asphalt mixture is isolated from the outside, aging of the old asphalt mixture is avoided, and meanwhile, emission of the asphalt fume as well as environmental pollution and damage are reduced, therefore, compared with the traditional old asphalt recycling modes, the method of the present invention accomplishes a fundamental change.

Additional advantages and features of the invention will become apparent from the description and drawings which follow, and may be realized by means of the instrumentalities and combinations particular pointed out in the appended claims.

DETAILED DESCRIPTION OF THE PREFERRED EMBODIMENT

The present invention will be further described below by reference to the embodiments, and the scope of protection of the present invention is not limited to the description below.

Embodiment 1

Figure 1:
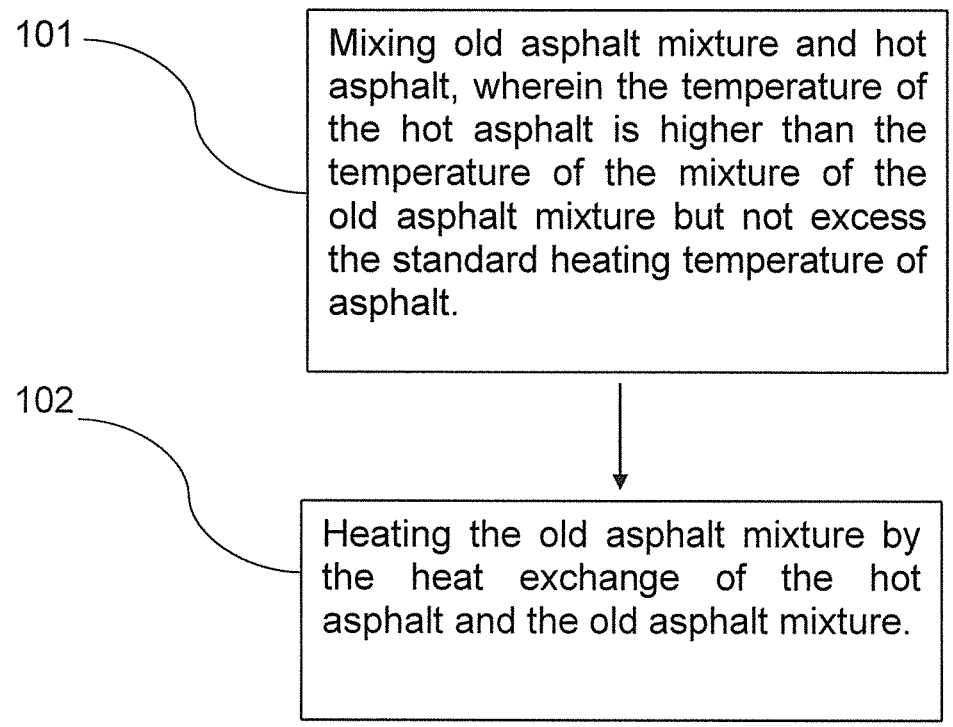
FIG. 1 is a flowchart of the hot recycling heating method for old asphalt mixture in the embodiments of the present invention.

As shown in FIG. 1, a hot recycling heating method for old asphalt mixture comprises the following steps:

STEP 1 MIXING: The old asphalt mixture is mixed with hot asphalt to form a mix of the old asphalt mixture and the hot asphalt, wherein the temperature of the hot asphalt is higher than the temperature of the old asphalt mixture, but not higher than the standard temperature of heating asphalt, the mix of the old asphalt mixture and the hot asphalt further needs to be heated as required during mixing to increase the temperature of the mix after mixing and the weight ratio of the old asphalt mixture to the hot asphalt in the mix, and the weight ratio of the old asphalt mixture to the hot asphalt is 0.1:1-40:1.

Step 2 Heat Exchange: The hot asphalt is immersed in the old asphalt mixture after mixing, heat in the hot asphalt is transferred to the old asphalt mixture, and heating for the old asphalt mixture is achieved by a gapless heat exchange environment between the hot asphalt and the old asphalt mixture.

The Mixing Step 1 may further comprise mixing the old asphalt mixture with normal ambient temperature asphalt, which is specifically as follows: at first, the normal ambient temperature asphalt is placed in a heat exchange container and covered by the old asphalt mixture, then the old asphalt mixture and the normal ambient temperature asphalt are heated, the heat-absorbing normal ambient temperature asphalt is molten to form the hot asphalt, the hot asphalt is immersed in the old asphalt mixture, a part of heat in the hot asphalt is transferred to the old asphalt mixture, and heating for the old asphalt mixture is achieved by heat exchange between the hot asphalt and the old asphalt mixture.

Wherein, the standard temperature of heating asphalt refers to those asphalt heating temperatures regulated in industrial standard specifications, such as *Industry Standard of the People's Republic of China JTG F41-2008 Technical Specifications for Highway Asphalt Pavement Recycling* and *Industry Standard of the People's Republic of China JTG F40-2004 Technical Specifications for Construction of Highway Asphalt Pavements*, these asphalt heating temperatures regulated in the aforementioned standards include: 160-170° C. for asphalt 50, 155-165° C. for asphalt 70, 150-160° C. for asphalt 90, 145-155° C. for asphalt 110, not more than 175° C. for SBS modified asphalts, and not more than 175° C. for EVA/PE modified asphalts; the heating temperatures of other asphalts or modified asphalts are determined according to tests.

Heating for the mix of the old asphalt mixture and the hot asphalt or for the old asphalt mixture and the normal ambient temperature asphalt is carried out in such common ways as heating by heat-conducting oil, heating by electric jacket, and the like. The range for the weight ratio of the old asphalt mixture to the hot asphalt may be widened by heating, and the weight ratio of the old asphalt mixture to the hot asphalt may reach 0.1:1-40:1 after mixing.

In addition to improving the heat exchange efficiency, the mix of the old asphalt mixture and the hot asphalt may be further agitated during mixing, or an additive for modifying asphalt performance may be added to the mix of the old asphalt mixture and the hot asphalt during mixing or agitation.

The hot asphalt may have a temperature of 60-170° C. and the old asphalt mixture may have a temperature of 5-30° C.

To facilitate direct use of the mix of the old asphalt mixture and the hot asphalt for producing a hot-mix recycled asphalt mixture under current specifications, the temperature of the mix of the old asphalt mixture and the hot asphalt may be kept at 145-165° C. by heating; or, the weight ratio of the old asphalt mixture to the hot asphalt after mixing are controlled and the temperatures of the hot asphalt and the old asphalt mixture before mixing are controlled, so that the temperature of the mix derived from mixing falls within a temperature range that is in conformity with the requirements.

When an intermittent mixing plant is applied to producing the recycled asphalt mixture, new asphalt, mineral aggregate and mineral powder need to be added and evenly agitated, and when the mix of the old asphalt mixture and the hot asphalt is used for replacing new asphalt and acts as a binding material in the intermittent mixing plant, the content of the mineral aggregate and mineral powder should be tested and deducted from the quantity of the added mineral aggregate and mineral powder because the old asphalt mixture already contains mineral aggregate and mineral powder; since the temperature of the mix may be lower than the temperature of the produced recycled asphalt mixture, the temperature (170-195° C.) of the added mineral aggregate and the time for agitation should be increased based upon heat balance and transfer; and if modified asphalt or warm mixed asphalt is used for producing a modified asphalt mixture or a warm mixed asphalt mixture, the temperature above should be increased or decreased in accordance with specific indicators of the modified asphalt or the warm mixed asphalt.

When a continuous mixing plant is applied to producing the recycled asphalt mixture, the mix functions in a way similar to that in production of the intermittent mixing plant, but the mix should be evenly agitated before its use.

In addition, by metering the hot asphalt and the old asphalt mixture as well as by testing the content of the ingredients in the old asphalt mixture (such as asphalt, mineral aggregate, mineral powder, etc.) and the gradation of the mineral aggregate, the content of the mineral aggregate, mineral powder and asphalt in the mix of the old asphalt mixture and the hot asphalt can be calculated, this calculation aims at replacing the tests for the content of the mineral aggregate and mineral powder in the mix of the old asphalt mixture and the hot asphalt and is capable of testing the gradation of the mineral aggregate conveniently, accordingly, the gradation of the mineral aggregate added can be adjusted when it subsequently replaces the new asphalt to produce the recycled asphalt mixture, and the recycled asphalt mixture with more reasonable gradation is produced.

The mix can be used for producing the recycled asphalt mixture in a complete or partial way, and the part containing more mineral aggregate can be selected when the mix is used in a partial way, in order to increase the ratio of the old asphalt mixture in use.

Embodiment 2

Old asphalt mixture is mixed with hot asphalt that has the same weight and a temperature of 150-160° C., the mix is heated and agitated simultaneously, and when the temperature of the mix of the old asphalt mixture and the asphalt reaches 150-160° C., the mix of the old asphalt mixture and the asphalt can be used as a binding material either in the intermittent asphalt mixture mixing plant for producing the recycled asphalt mixture, or in asphalt pavement construction. If the mix is used in asphalt pavement construction (tack coat, prime coat, synchronous crushed stone seal coat, etc.), the part having less mineral aggregate and smaller grain size of the mineral aggregate can be selected to meet the requirements of construction technology.

Embodiment 3

10 parts of old asphalt mixture (in weight parts) is mixed with 1 part of hot asphalt having a temperature of 150-160° C. (in weight parts), the mix is heated and agitated simultaneously, the temperature of the mix of the old asphalt mixture and the asphalt is kept at 150-160° C., and if the performance indexes of the asphalt in the mix are not in conformity with relevant requirements, an asphalt recycling agent can be added to improve the performance of the asphalt in the mix. In this case, the mix of the old asphalt mixture and the hot asphalt can be used as a binding material during the process of producing the recycled asphalt mixture.

Embodiment 4

0.1 part of old asphalt mixture having a temperature of 5-30° C. (in weight parts) is mixed with 1 part of hot asphalt having a temperature of 155-165° C. (in weight parts), and the mix of the old asphalt mixture and the asphalt has a temperature of 150-160° C. In this case, the mix of the old asphalt mixture and the hot asphalt can be used as a binding material either during the process of producing the recycled asphalt mixture, or in asphalt pavement construction.

Figure 2:
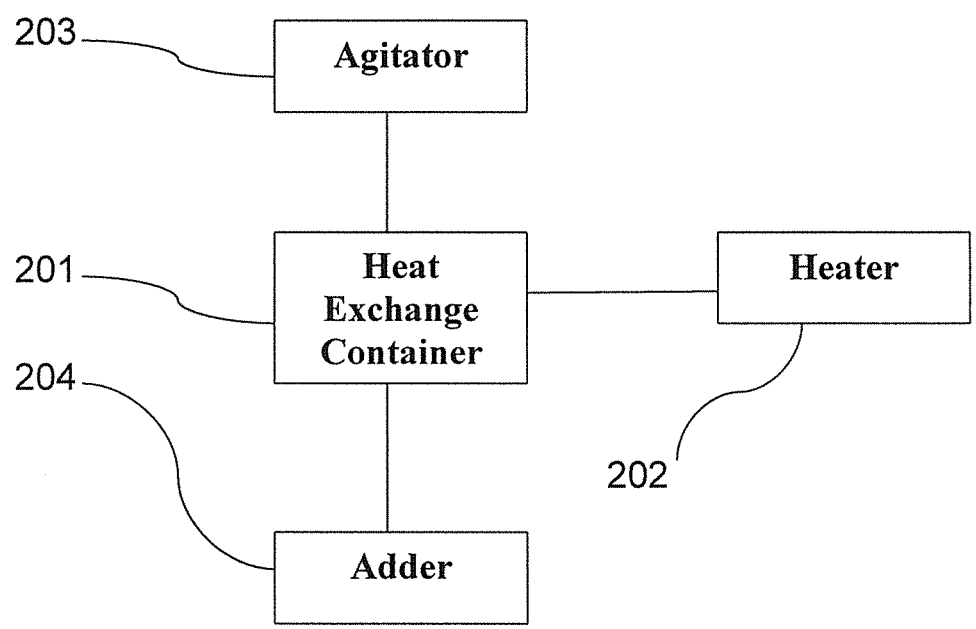
FIG. 2 is a structural view of a hot recycling heating plant for old asphalt mixture in the embodiments of the present invention.

In addition, further provided in the embodiments of the present invention is a hot recycling heating plant for old asphalt mixture, as shown in FIG. 2, which comprises:

a heat exchange container 201, for receiving the mix of the old asphalt mixture and the hot asphalt and heating the old asphalt mixture by a gapless heat exchange environment between the hot asphalt and the old asphalt mixture;

wherein, the temperature of the hot asphalt is higher than the temperature of the old asphalt mixture, but not higher than the standard temperature of heating asphalt.

The hot recycling heating plant may further comprise:

a heater 202, for heating the mix in the heat exchange container 201 and keeping the mix of the old asphalt mixture and the hot asphalt at a temperature that is in conformity with the requirements, wherein the specific temperature is determined according to actual needs, for example, 145-170° C.

The hot recycling heating plant may further comprise:

an agitator 203, for agitating the mix of the old asphalt mixture and the hot asphalt in the heat exchange container 201.

The hot recycling heating plant may further comprise:

an adder 204, for adding an additive for modifying asphalt performance to the mix of the old asphalt mixture and the hot asphalt in the heat exchange container 201.

Described above are the preferred embodiments of the present invention only that are not intended to limit the present invention, and any amendments, equivalent substitutions and modifications made without departing from the spirit and principle of the present invention shall be included within the scope of protection of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hot recycling heating method for old asphalt mixture, which achieves heating for old asphalt mixture by a gapless heat exchange environment between hot asphalt and old asphalt mixture, overcomes the problem of high aging possibility of the old asphalt mixture and the problem of environmental pollution caused by generation and emission of asphalt fume in traditional old asphalt mixture hot recycling technologies, and accomplishes reasonable utilization of old asphalt mixture resources, the method comprising the steps of:

(a) mixing an old asphalt mixture at ambient temperature with hot asphalt to form a mix of the old asphalt mixture and the hot asphalt, wherein the old asphalt mixture is not heated before mixing with the hot asphalt, wherein the temperature of the hot asphalt is higher than the temperature of the old asphalt mixture, but not higher than the standard temperature of heating asphalt, the mix of the old asphalt mixture and the hot asphalt further to be heated as required during mixing to increase the temperature of the mix and the weight ratio of the old asphalt mixture to the hot asphalt in the mix, and the weight ratio of the old asphalt mixture to the hot asphalt is be 0.1:1-40:1; and (b) immersing the hot asphalt in the old asphalt mixture to soak the old asphalt mixture in the hot asphalt during mixing, wherein a part of heat in the hot asphalt is transferred to the old asphalt mixture, and heating for the old asphalt mixture being achieved by a gapless heat exchange environment between the hot asphalt and the old asphalt mixture.

2. The hot recycling heating method according to claim 1, further comprising a step of agitating the mix of the old asphalt mixture and the hot asphalt to improve the heat exchange efficiency between the old asphalt mixture and the hot asphalt.

3. The hot recycling heating method according to claim 1, wherein the hot asphalt has a temperature of 60-170° C.

4. The hot recycling heating method according to claim 1, further comprising a step of increasing the temperature of the mix of the old asphalt mixture and the hot asphalt to 145-170° C. by heating and keeping the temperature at 145-170° C.

5. The hot recycling heating method according to claim 1, wherein an additive for modifying asphalt performance is added to the mix of the old asphalt mixture and the hot asphalt during mixing or agitation.

6. The hot recycling heating method according to claim 2, wherein an additive for modifying asphalt performance is added to the mix of the old asphalt mixture and the hot asphalt during mixing or agitation.

* * * * *